(12) United States Patent
Sato et al.

(10) Patent No.: US 7,792,356 B2
(45) Date of Patent: Sep. 7, 2010

(54) IMAGING DEVICE

(75) Inventors: Masaaki Sato, Kanagawa (JP);
Shinichiro Saito, Kanagawa (JP);
Hirotake Cho, Kanagawa (JP)

(73) Assignee: Sony Corporation, Tokyo (JP)

( * ) Notice: Subject to any disclaimer, the term of this patent is extended or adjusted under 35 U.S.C. 154(b) by 818 days.

(21) Appl. No.: 11/734,086

(22) Filed: Apr. 11, 2007

(65) Prior Publication Data
US 2008/0123943 A1    May 29, 2008

(30) Foreign Application Priority Data
Apr. 14, 2006  (JP) .............................. 2006-111633

(51) Int. Cl.
*G06K 9/00* (2006.01)
(52) U.S. Cl. .................. 382/167; 382/162; 382/165; 382/292; 382/300; 345/698; 345/699
(58) Field of Classification Search .............. 382/292, 382/300, 162, 164, 165, 167; 358/428, 525; 345/698, 699; 348/441, 538
See application file for complete search history.

(56) References Cited

U.S. PATENT DOCUMENTS

| 5,652,621 | A  | * | 7/1997  | Adams et al. ............... 348/272 |
| 6,469,290 | B1 |   | 10/2002 | Suzuki |
| 6,813,040 | B1 | * | 11/2004 | Uchino et al. ............... 358/1.9 |
| 7,324,707 | B2 | * | 1/2008  | Huang et al. ................ 382/300 |
| 2001/0024237 | A1 | | 9/2001 | Osada et al. |
| 2005/0225655 | A1 | | 10/2005 | Suzuki |
| 2005/0280727 | A1 | | 12/2005 | Sato |
| 2006/0078229 | A1 | * | 4/2006 | Huang et al. ................ 382/300 |

FOREIGN PATENT DOCUMENTS

| EP | 1357760    | 10/2003 |
| JP | 07-236147  | 9/1995  |

(Continued)

OTHER PUBLICATIONS

Japanese Office Action dated May 14, 2008 for Application No. 2006-111633.

(Continued)

*Primary Examiner*—Samir A. Ahmed
*Assistant Examiner*—Ali Bayat
(74) *Attorney, Agent, or Firm*—Sonnenschein Nath & Rosenthal LLP

(57) ABSTRACT

An imaging device includes an image sensor having a plurality of chromatic color pixels and high-sensitivity pixels having higher sensitivity to incident light than the chromatic color pixels arranged in a checkerboard pattern, a correlation detector that detects correlation of an imaged subject from a signal component of the high-sensitivity pixels and a signal component of the chromatic color pixels, a color judgment block that judges whether or not the imaged subject is of chromatic color from the signal component of the chromatic color pixels, and a pixel interpolator that switches between pixel interpolation methods according to the signal judged in the color judgment block that judges whether or not the subject is of chromatic color, the pixel interpolator giving high priority to interpolation using pixels showing strong correlation based on the information from the correlation detector when the color judgment block judges that the subject is of chromatic color.

3 Claims, 19 Drawing Sheets

FOREIGN PATENT DOCUMENTS

| | | |
|---|---|---|
| JP | 2002-2165226 | 11/2000 |
| JP | 2003-316163 | 11/2000 |
| JP | 2001-218037 | 8/2001 |
| JP | 2001-218073 | 8/2001 |
| JP | 2001-245311 | 9/2001 |
| JP | 2001-339735 | 12/2001 |
| JP | 2006-186965 | 7/2006 |
| WO | WO-02/060186 | 8/2002 |

OTHER PUBLICATIONS

Shree K. Nayar and Tomoo Mitsunaga; High Dynamic Range Imaging: Spatially Varying Pixel Exposures; Proceedings 2000 IEEE Conference on Computer Vision and Pattern Recognition; Hilton Head Island, SC; Jun. 13-15, 2000.

International Search Report dated Aug. 2, 2007.

* cited by examiner

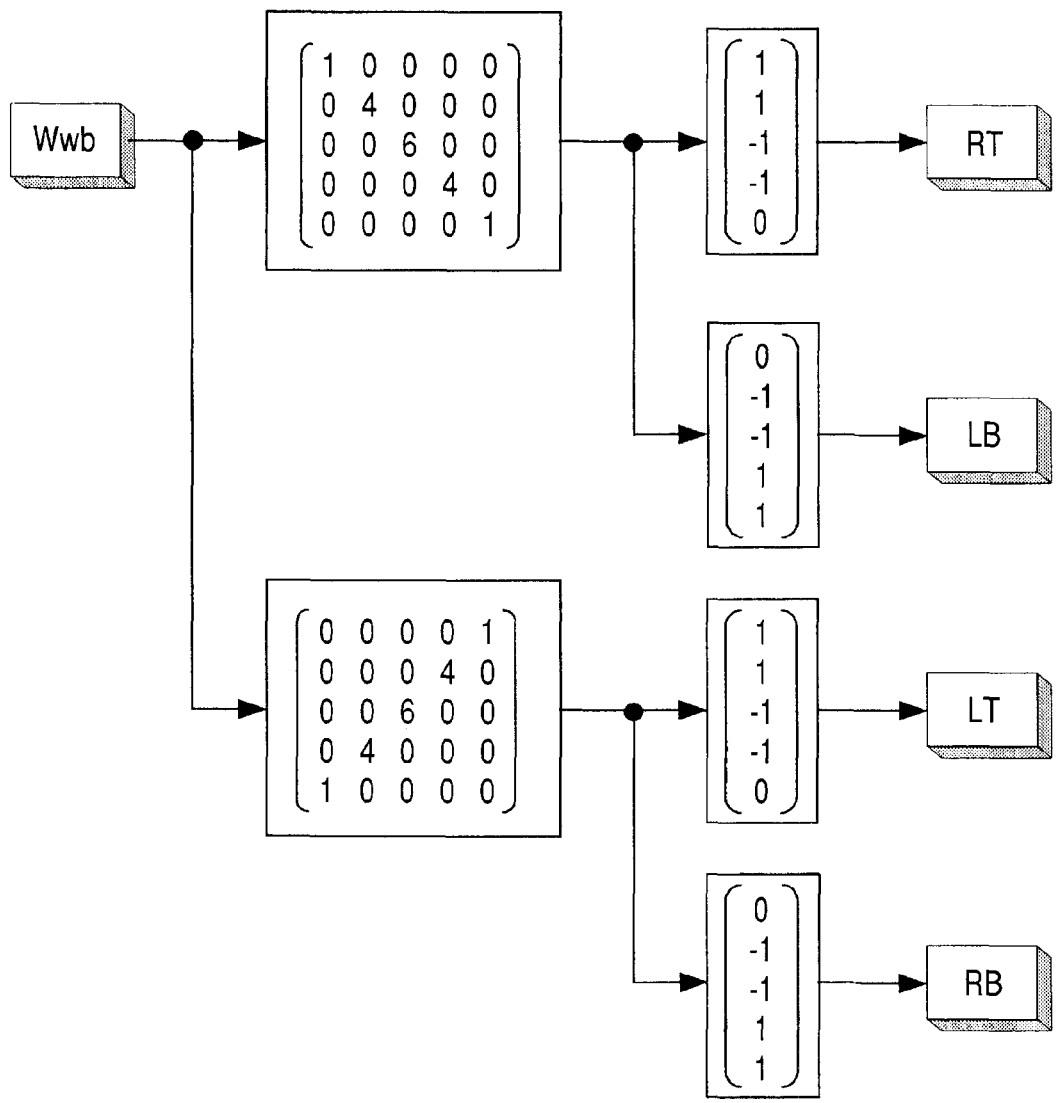

FIG. 11

FIG. 12
$\begin{cases} \text{revRT} = 1/\text{RT} \\ \text{revLB} = 1/\text{LB} \\ \text{revLT} = 1/\text{LT} \\ \text{revRB} = 1/\text{RB} \\ \text{revSUM} = \text{revRT}+\text{revRB}+\text{revLT}+\text{revLB} \\ \\ \text{RTGain} = \text{revRT}/\text{revSUM} \\ \text{LBGain} = \text{revLB}/\text{revSUM} \\ \text{LTGain} = \text{revLT}/\text{revSUM} \\ \text{RBGain} = \text{revRB}/\text{revSUM} \end{cases}$

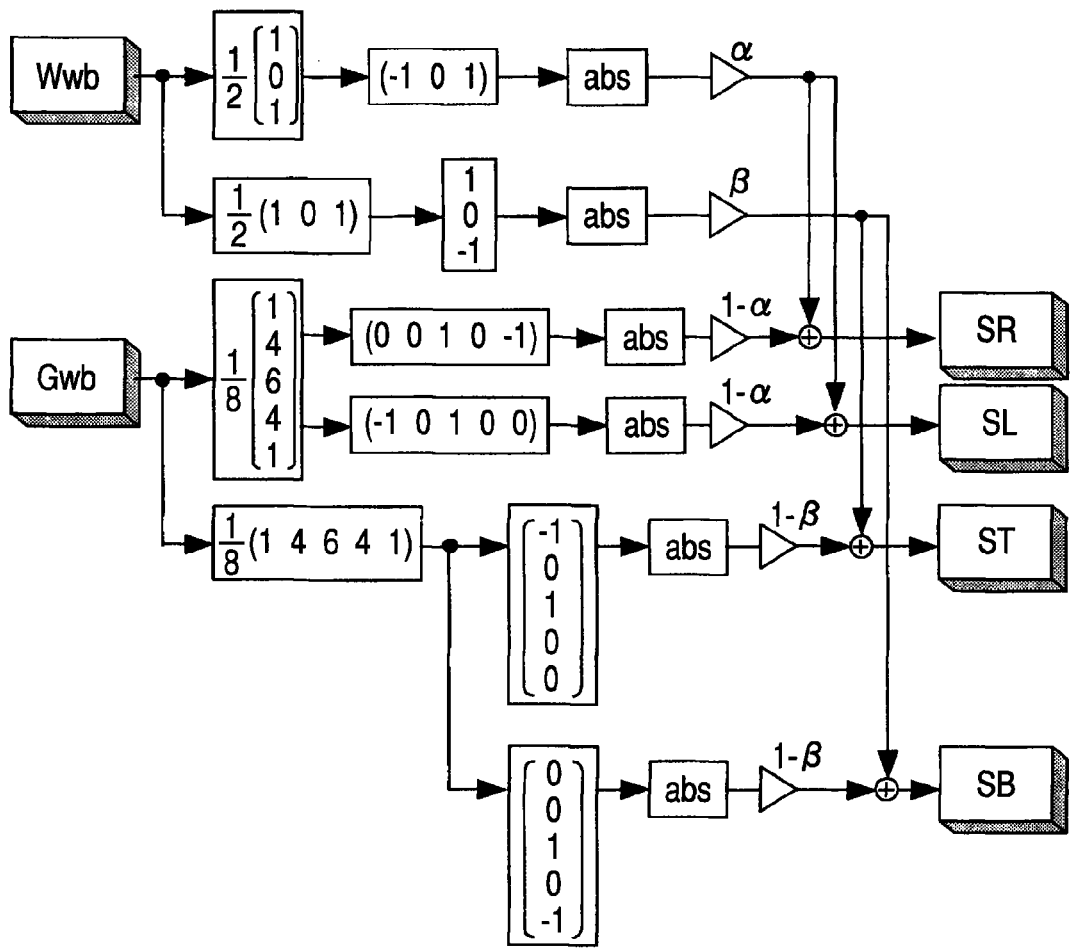

$$\begin{cases} \text{revSR} = 1/\text{SR} \\ \text{revSL} = 1/\text{SL} \\ \text{revST} = 1/\text{ST} \\ \text{revSB} = 1/\text{SB} \\ \text{revSUM} = \text{revSR}+\text{revSL}+\text{revST}+\text{revSB} \\ \\ \text{RGain} = \text{revSR}/\text{revSUM} \\ \text{LGain} = \text{revSL}/\text{revSUM} \\ \text{TGain} = \text{revST}/\text{revSUM} \\ \text{BGain} = \text{revSB}/\text{revSUM} \end{cases}$$

FIG. 18
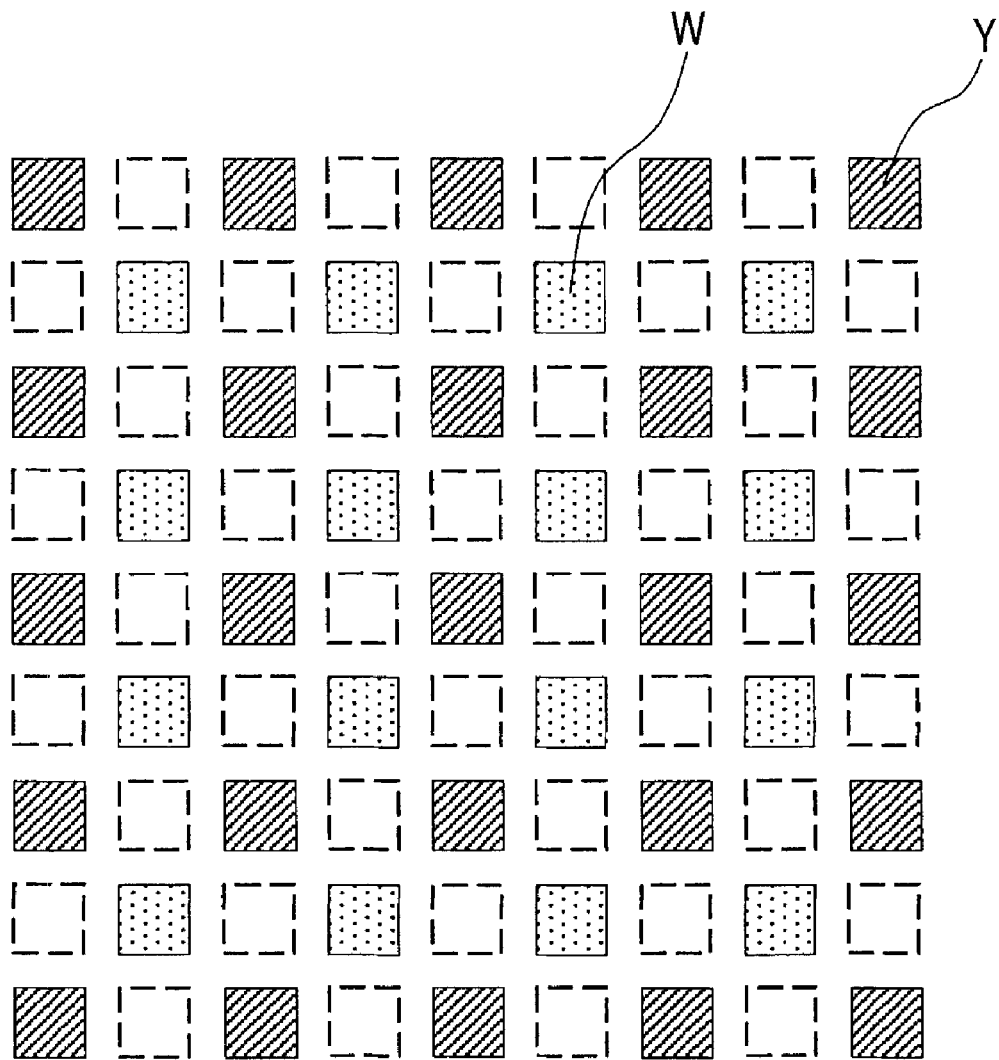
 : PHASE WHERE NO PIXEL IS PRESENT
Y: (BRIGHTNESS COMBINED FROM R/G/B)
※ R/G/B ARE ALSO PRESENT

FIG. 19

$$R_{ave}, G_{ave}, B_{ave}, Y_{ave} = \begin{bmatrix} 0 & 0 & 0 & 0 & 1 & 0 & 0 & 0 & 0 \\ 0 & 0 & 0 & 0 & 0 & 0 & 0 & 0 & 0 \\ 0 & 0 & 1 & 0 & 2 & 0 & 1 & 0 & 0 \\ 0 & 0 & 0 & 0 & 0 & 0 & 0 & 0 & 0 \\ 1 & 0 & 2 & 0 & 4 & 0 & 2 & 0 & 1 \\ 0 & 0 & 0 & 0 & 0 & 0 & 0 & 0 & 0 \\ 0 & 0 & 1 & 0 & 2 & 0 & 1 & 0 & 0 \\ 0 & 0 & 0 & 0 & 0 & 0 & 0 & 0 & 0 \\ 0 & 0 & 0 & 0 & 1 & 0 & 0 & 0 & 0 \end{bmatrix}$$

$$W_{ave} = \begin{bmatrix} 0 & 0 & 0 & 0 & 0 & 0 & 0 & 0 & 0 \\ 0 & 0 & 0 & 1 & 0 & 1 & 0 & 0 & 0 \\ 0 & 0 & 0 & 0 & 0 & 0 & 0 & 0 & 0 \\ 0 & 1 & 0 & 3 & 0 & 3 & 0 & 1 & 0 \\ 0 & 0 & 0 & 0 & 0 & 0 & 0 & 0 & 0 \\ 0 & 1 & 0 & 3 & 0 & 3 & 0 & 1 & 0 \\ 0 & 0 & 0 & 0 & 0 & 0 & 0 & 0 & 0 \\ 0 & 0 & 0 & 1 & 0 & 1 & 0 & 0 & 0 \\ 0 & 0 & 0 & 0 & 0 & 0 & 0 & 0 & 0 \end{bmatrix}$$

BRIGHTNESS SYSTEM $$W_{Ynew} = Y \times \frac{W_{ave}}{Y_{ave}}$$

CHROMA SYSTEM $$R_{new} = R \times \frac{W_{ave}}{R_{ave}} \qquad G_{new} = G \times \frac{W_{ave}}{G_{ave}} \qquad B_{new} = B \times \frac{W_{ave}}{B_{ave}}$$

W GENERATED BY NORMALIZATION
※ R/G/B ARE ALSO PRESENT

INTERPOLATE R/G/B WHERE ONLY W IS PRESENT $$R_{11} = \frac{R_{00}+R_{02}+R_{20}+R_{22}}{W_{00}+W_{02}+W_{20}+W_{22}} \times W_{11}$$

PIXEL

PHASE WHERE
NO PIXEL IS PRESENT

PIXEL

W GENERATED BY NORMALIZATION
※ R/G/B ARE ALSO PRESENT

W PIXEL $$\begin{cases} revSR = 1/SR \\ revSL = 1/SL \\ revST = 1/ST \\ revSB = 1/SB \\ revSUM = revSR+revSL+revST+revSB \\ \\ RGain = revSR/revSUM \\ LGain = revSL/revSUM \\ TGain = revST/revSUM \\ BGain = revSB/revSUM \end{cases}$$

IMAGING DEVICE

CROSS REFERENCES TO RELATED APPLICATIONS

The present invention contains subject matter related to Japanese Patent Application JP 2006-111633 filed in the Japanese Patent Office on Apr. 14, 2006, the entire contents of which being incorporated herein by reference.

BACKGROUND OF THE INVENTION

1. Field of the Invention

The present invention relates to an imaging device in which pixels containing luminance information are disposed.

2. Description of the Related Art

In an image sensor of related art configured to have an RGB square Bayer layout, pixel interpolation is carried out based on correlation information of G (green) pixels arranged above and below as well as right and left (see JP-A-2001-218073, for example). In an image sensor in which pixels containing luminance information are disposed and the layout is inclined 45° to a square, green pixels are not arranged above and below as well as right and left, so that an pixel interpolation method of related art may not be carried out. Therefore, correlation detection for pixel interpolation in an image sensor having such a pixel layout is generally determined by averaging pixels of the same color. However, such an interpolation method has disadvantages of leveled off spatial frequencies at high frequencies and generation of false colors. Another disadvantage of this correlation detection method is that color separation may not be correctly carried out in signal processing of the luminance signal Y and chrominance signal Cr/Cb.

SUMMARY OF THE INVENTION

Problems to be solved are leveled off spatial frequencies at high frequencies and generation of false colors in correlation detection. Another problem to be solved is that color separation may not be correctly carried out in signal processing of the luminance signal Y and chrominance signal Cr/Cb.

It is desirable to prevent false colors generated in a chromatic color subject and extend the frequency band compared to a simple average pixel interpolation.

According to an embodiment of the invention, there is provided an imaging device including an image sensor having a plurality of chromatic color pixels and high-sensitivity pixels having higher sensitivity to incident light than the chromatic color pixels arranged in a checkerboard pattern, a correlation detector that detects correlation of an imaged subject from a signal component of the high-sensitivity pixels and a signal component of the chromatic color pixels, a color judgment block that judges whether or not the imaged subject is of chromatic color from the signal component of the chromatic color pixels, and a pixel interpolator that switches between pixel interpolation methods according to the signal judged in the color judgment block that judges whether or not the subject is of chromatic color. When the color judgment block judges that the subject is of chromatic color, the pixel interpolator gives high priority to interpolation using pixels showing strong correlation based on the information from the correlation detector.

In the above embodiment of the invention, there are provided the color judgment block that judges whether or not the imaged subject is of chromatic color and the pixel interpolator that switches between pixel interpolation methods according to the signal judged in the color judgment block that judges whether or not the subject is of chromatic color, the pixel interpolator giving high priority to interpolation using pixels showing strong correlation based on the information from the correlation detector when the color judgment block judges that the subject is of chromatic color. The provision of the color judgment block and the pixel interpolator allows interpolation of the chromatic color pixels.

According to the above embodiment of the invention, provision of the pixel interpolator that gives high priority to interpolation using pixels showing strong correlation based on the information from the correlation detector when the color judgment block judges that the subject is of chromatic color allows interpolation of the chromatic color pixels, thereby providing an advantage of an extended frequency band compared to simple average pixel interpolation. Furthermore, there is provided another advantage of suppressed false colors in a chromatic color subject compared to simple average pixel interpolation.

BRIEF DESCRIPTION OF THE DRAWINGS

FIG. 11 shows an algorithm illustrating an example of correlation detection;

FIG. 12 shows correlation coefficient calculation equations;

FIG. 15 shows an algorithm illustrating an example of correlation detection;

FIG. 16 shows correlation coefficient calculation equations;

FIG. 18 is a layout diagram showing an example of signal layout after level balance;

FIG. 19 shows an algorithm illustrating an example of a low-pass filter;

DESCRIPTION OF THE PREFERRED EMBODIMENTS

The imaging device according to an embodiment (first example) of the invention will be described below with reference to FIGS. 1 to 9.

Figure 8:
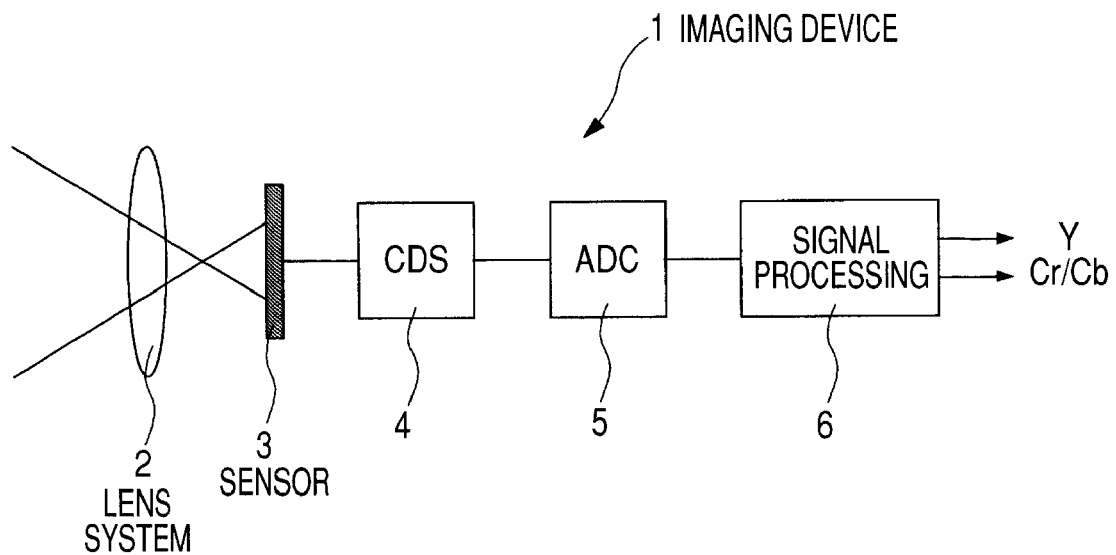
FIG. 8 is a block diagram showing an example of the imaging device to which the invention is applied.

Firstly, an example of the imaging device to which the invention is applied will be described with reference to the block diagram of FIG. 8. FIG. 8 shows an entire camera system using an image sensor, by way of example.

As shown in FIG. 8, the imaging device 1 includes a lens system 2 that focuses an image, a sensor 3 having pixels for photoelectric conversion, a correlated double sampling (CDS) portion 4 that receives the electric signal, removes 1/f noise and extracts only a signal component, an analog-to-digital converter (ADC) 5 that converts the pixel signal from the sensor, which is an analog signal, into a digital signal, and a signal processing block 6 that outputs the digitized sensor signal as a final image signal.

In the imaging device 1, an image focused by the lens system 2 is imaged onto the pixels of the sensor 3 and outputted to the CDS portion 4 as an electric signal. The CDS portion 4 removes 1/f noise and extracts only a signal component. Then, the ADC 5 converts the pixel signal from the sensor, which is an analog signal, into a digital signal. The digitized sensor signal is then inputted to the signal processing block 6 and processed into a final image signal.

Next, an example of color layout of the sensor 3 in the imaging device 1 will be described with reference to FIG. 9.

Figure 9:
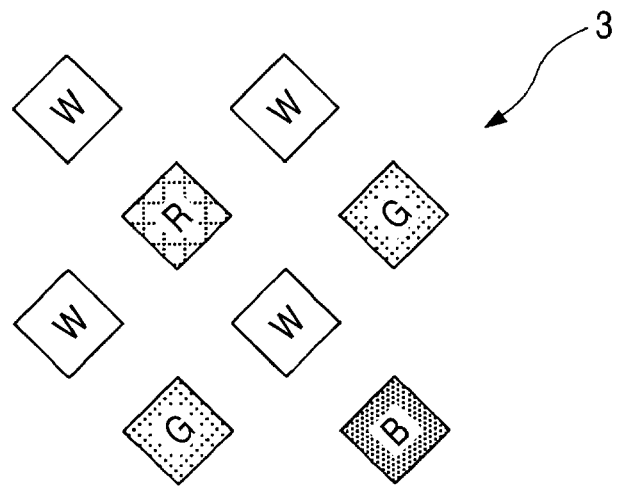
FIG. 9 is a pixel layout diagram showing an example of color layout of a sensor in the imaging device.

As shown in FIG. 9, in the color layout in the sensor 3, pixels for obtaining luminance information (in this example, high-sensitivity pixels having higher sensitivity to incident light than chromatic color pixels) are arranged at phase positions having spatial phases shifted by half a cycle with respect to an RGB square Bayer pixel layout of related art. The high-sensitivity pixels are formed of, for example, white pixels or gray pixels. The following description will be made with reference to an example where white (W) pixels are arranged.

Figure 1:
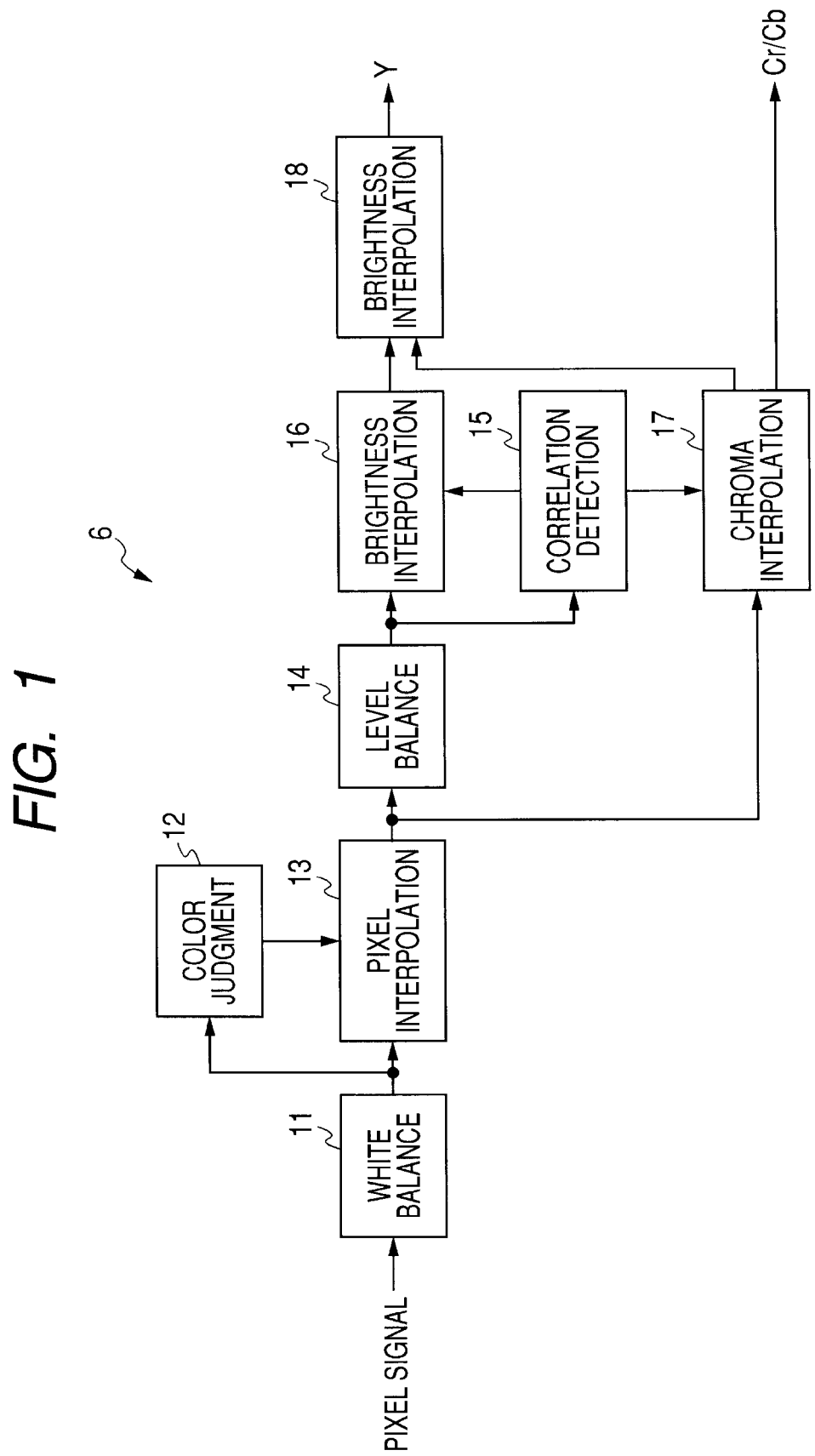
FIG. 1 is a block diagram showing the imaging device according to an embodiment (first example) of the invention.
Figure 2:
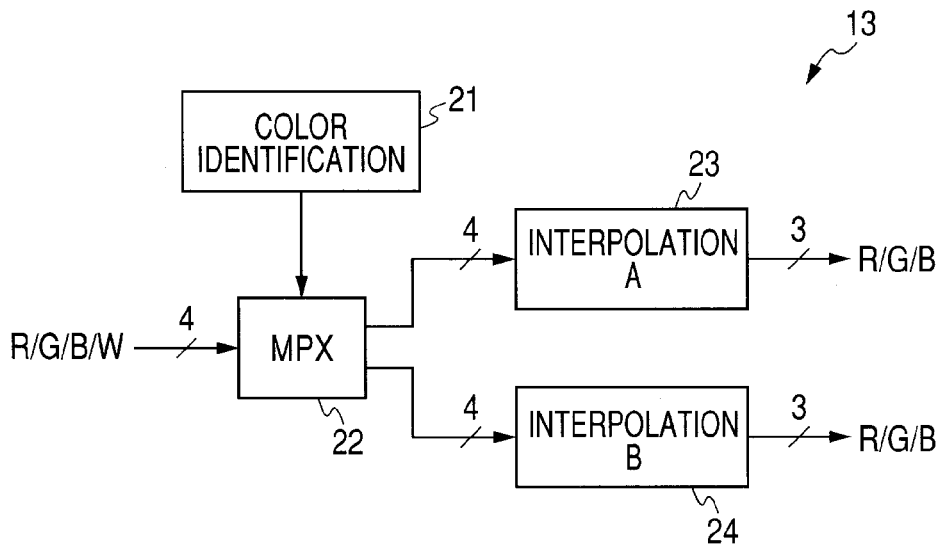
FIG. 2 is a block diagram showing an example of the details of a pixel interpolation block.

The main feature of the invention will now be described. FIG. 1 is a block diagram showing the details of the signal processing block 6. FIG. 2 is a block diagram showing the inner components of a pixel interpolation block 13 in the signal processor of the camera system shown in FIG. 1.

As shown in FIG. 1, the pixel signal from the sensor that has been converted into the digital signal by the analog-to-digital converter (ADC) is inputted to a white balance (WB) block 11, where the pixel output from the sensor is normalized with respect to G (Green) pixels, which are the chromatic color pixels, or W pixels, which are the high-sensitivity pixels. In this example, although the pixel output is normalized with respect to W pixels by way of example, the pixel output can also be normalized with respect to gray pixels. The following description will be made with reference to W pixels.

The normalized signal is inputted to a color judgment block 12 and a pixel interpolation block 13 independent of each other. The color judgment block 12 judges whether or not the pixel of interest and the surrounding pixels are chromatic color pixels and sends the result to the pixel interpolation block 13.

The pixel interpolation block 13 performs interpolation on the phase where one of R/G/B pixels is present by interpolating two lacking colors. For example, B/R pixels are used for interpolation on the position where a G pixel is present. The pixel interpolation block 13 uses the judgment result of the color judgment block 12 to dynamically change the interpolation process. When the pixel of interest is not a chromatic color pixel, the pixel signal from the pixel of interest is positively used to improve the resolution when pixels to be used for interpolation are generated, while when the pixel of interest is a chromatic color pixel, signals from the surrounding pixels having the same colors as those of pixels to be used for interpolation are interpolated.

The process after the pixel interpolation is divided into two lines, that is, luminance generation and chrominance generation. The process line of luminance generation will be first described.

The R/G/B pixel signals generated in the pixel interpolation block 13 undergo a conversion process, such as an NTSC luminance conversion equation as a representative example, so as to generate a Y signal. Since the generated Y signal and the W pixels do not match with each other in terms of signal level, level matching is carried out in a level balance block 14. The level balance block 14 generates a (high-frequency) luminance signal in which the level of the W signal is the same as that of the Y signal.

However, since a pixel having a luminance signal and a pixel having no luminance signal are spatially disposed and alternately appear (1/2 in terms of spatial phase), the phase where no pixel is present is complemented by a pixel. This complementation is carried out in a luminance interpolation block 16. Judgment of this complementation process is carried out in a correlation detection block 15. The correlation detection block 15 carries out this process by using the luminance signal as a detection signal. The detection result is used both in the luminance generation and the chrominance generation.

In a chrominance interpolation block 17, R/G/B pixels are first used for interpolation on the phase where a W pixel is present. The interpolation is calculated, for example, by computing the ratio of the surrounding W pixels to R/G/B pixels. Furthermore, to perform pixel complementation on the phase where no R/G/B pixel is spatially present, the detection result of the correlation detection block 15, which has been described in the luminance generation, is reflected for the pixel complementation.

A luminance interpolation block 18 is a block that recombines the high-frequency luminance signal and the R/G/B signals computed in the chrominance generation process to generate a low-frequency Y luminance signal. This process suppresses degradation in luminance reproducibility at low frequencies.

Y/Cr/Cb signals are thus generated and the pixel interpolation process is completed.

The details of the pixel interpolation block 13 include, as shown in FIG. 2 by way of example, a color identification block 21 that identifies the color filter of the pixel at the phase to be interpolated and a multiplexer (MPX) 22 that directs the signal to either of appropriate interpolation processes (an interpolator A 23 or an interpolator B 24, for example).

Figure 3:
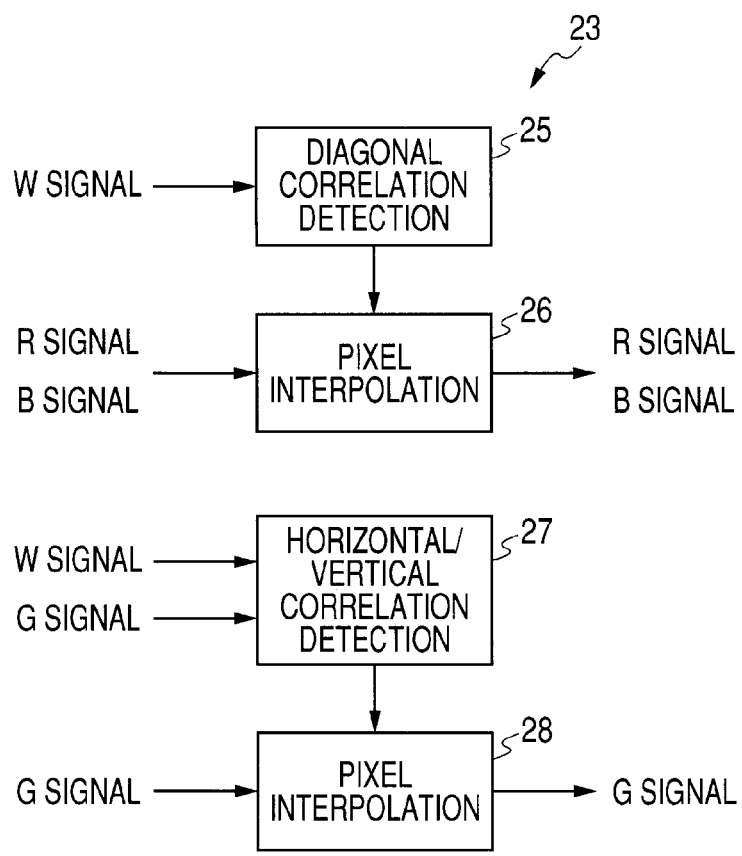
FIG. 3 is a block diagram showing an example of an interpolator A.

Next, the interpolation process (the interpolator A 23, for example) performed in the case where the color filter of the pixel at the phase to be interpolated is R (red) or B (blue) will be described with reference to FIGS. 3, 4A and 4B. FIG. 3 is a block diagram of the interpolator A 23, and FIG. 4 is a conceptual view showing how the interpolator A 23 performs pixel interpolation.

Figure 4:
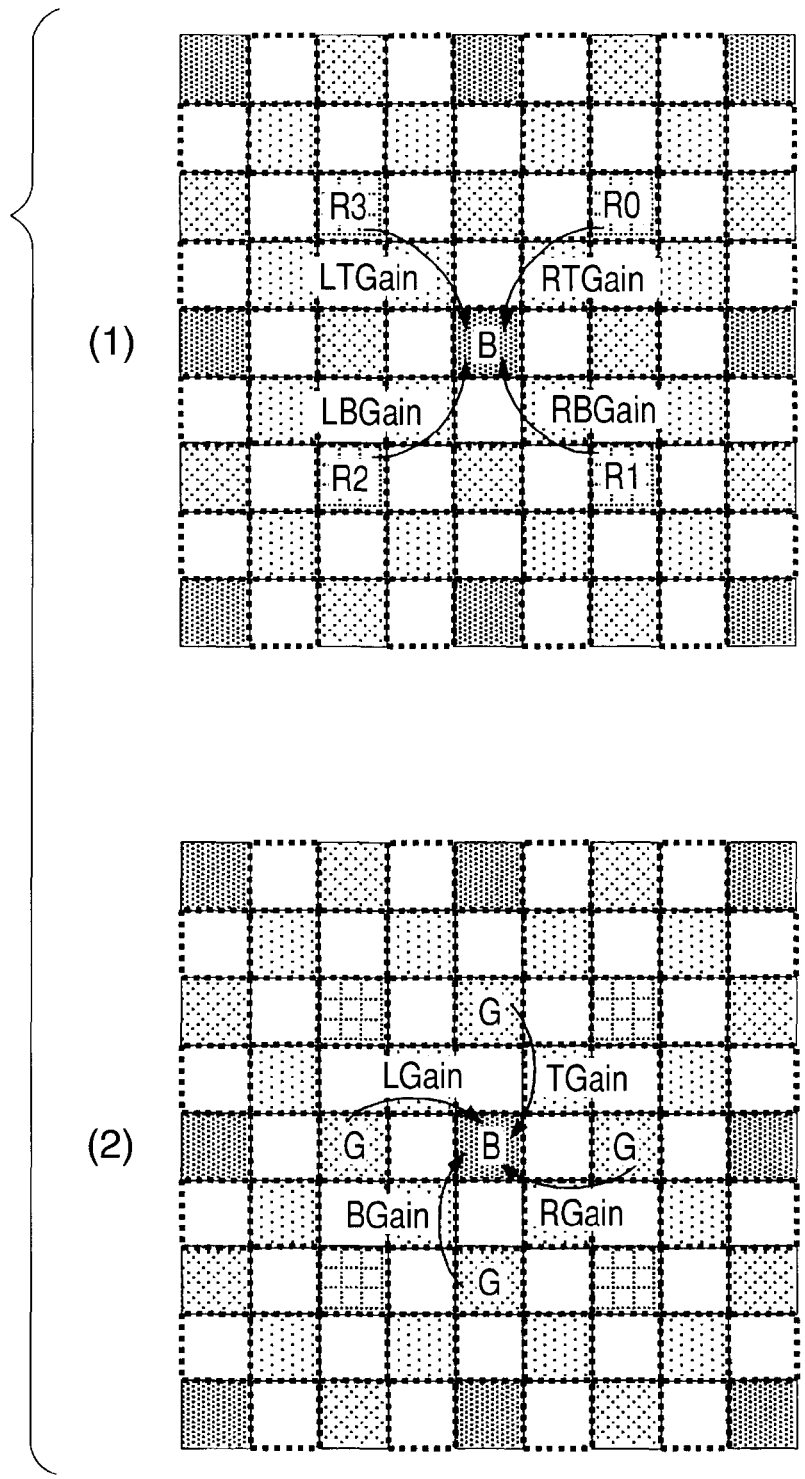
FIG. 4 shows layout diagrams illustrating an example of how the interpolator A performs pixel interpolation.

As shown in FIG. 4, the pixel at the phase to be interpolated is a B pixel, and pixels used for interpolation are R and B pixels. Since R pixels that can be used for interpolation are situated in four diagonal directions (see (1) in FIG. 4) with respect to the B pixel, a correlation detector 25 shown in FIG. 3 is used to perform correlation detection in the diagonal directions and a pixel interpolator 26 is used to change the mixing ratio of the R pixels in the four directions according to the correlation intensities outputted from the correlation detector 25 so as to perform interpolation of the R pixels. G pixels can be similarly handled. From the four up/down and right/left directions (see (2) in FIG. 4), a correlation detector 27 shown in FIG. 3 is used to perform correlation detection in the horizontal and vertical directions, and a pixel interpolator 28 performs interpolation of the G pixels according to the correlation detection result outputted from the correlation detector 27 by using the mixing ratios of the G pixels in the four directions.

When the pixel at the phase to be interpolated is R, a similar process can be applied except that B is replaced with R and R is replaced with B. That is, the pixel at the phase to be interpolated is an R pixel, and the pixels used for interpolation are B and G pixels. Since B pixels that can be used for interpolation are situated in four diagonal directions with respect to the R pixel, correlation detection is performed in the diagonal directions and the mixing ratios of the B pixels in the four directions is changed according to the correlation intensities so as to perform interpolation of the B pixels. G pixels can be similarly handled. Interpolation of the G pixels is carried out according to the correlation detection result from the four up/down and right/left directions by using the mixing ratio of G pixels in the four directions.

Figure 5:
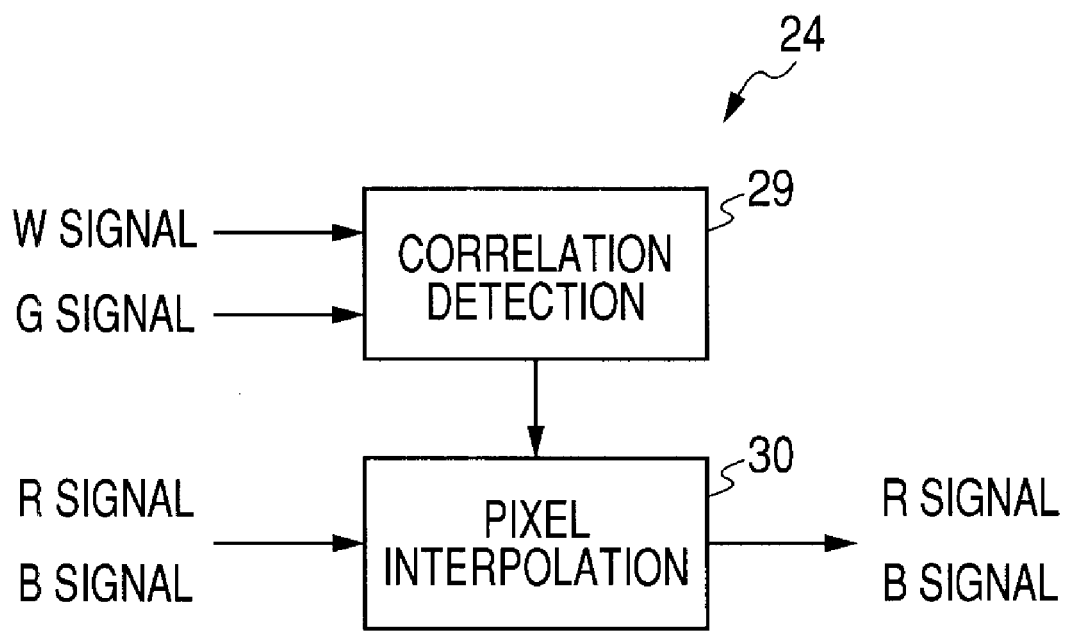
FIG. 5 is a block diagram showing an example of an interpolator B.
Figure 6:
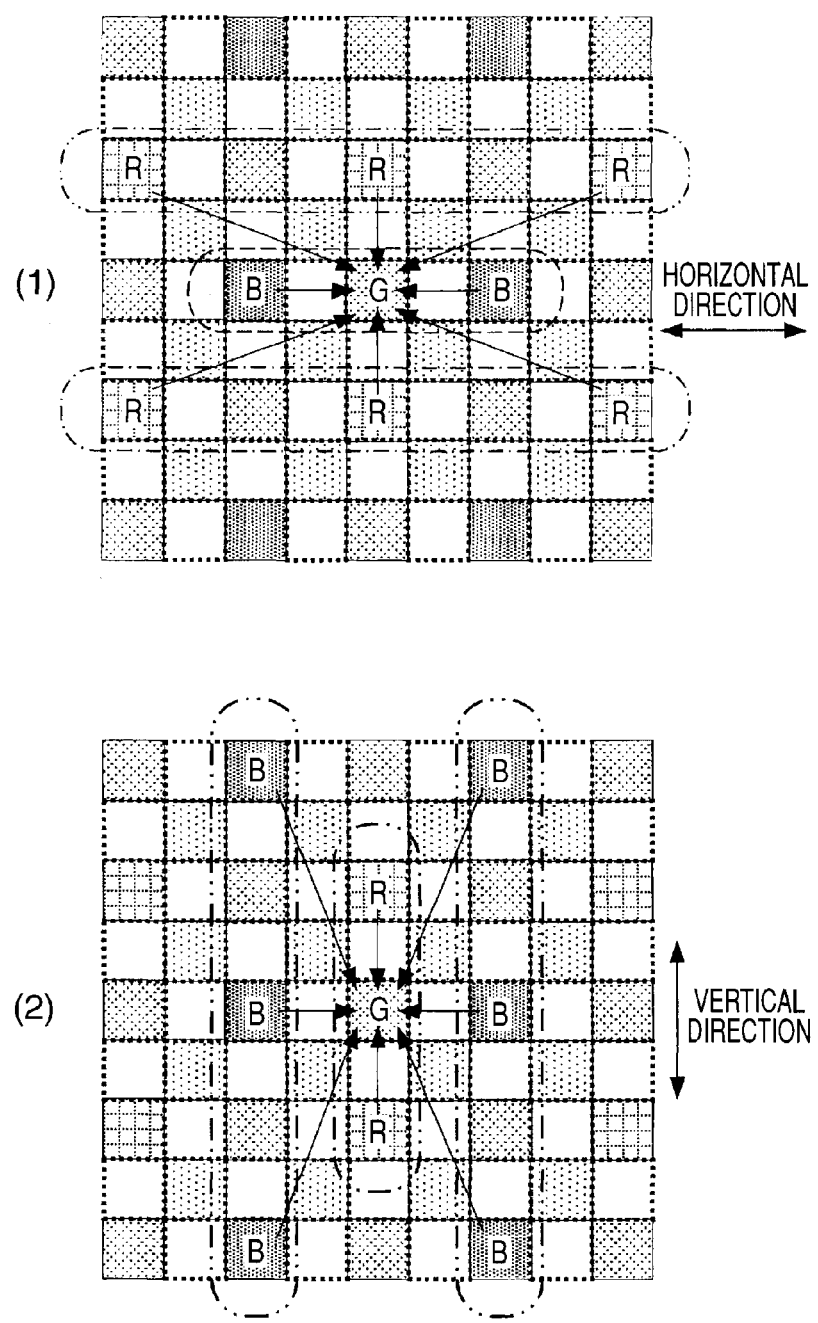
FIG. 6 is a layout diagram showing examples of how the interpolator B performs pixel interpolation when correlation is strong in the horizontal and vertical directions, respectively.

Next, the process (the interpolator B 24) performed in the case of where the color filter of the pixel at the phase to be interpolated is G will be described with reference to FIGS. 5, 6A and 6B. FIG. 5 is a block diagram of the interpolator B 24. (1) in FIG. 6 is a conceptual view showing how the interpolator B 24 performs pixel interpolation when correlation is strong in the horizontal direction, while (2) in FIG. 6 is a conceptual view showing how the interpolator B 24 performs pixel interpolation when correlation is strong in the vertical direction. The directions in which the R and B pixels used for interpolation are arranged vary according to the phase of the G pixel.

As shown in FIG. 6, although six R pixels are present in the horizontal direction and six B pixels are present in the vertical direction, respectively, this relationship will be reversed depending on the phase of the G pixel. As shown in FIG. 5, the G and W pixels are inputted to a correlation detector 29 as correlation detection signals so as to determine correlation intensities in the up/down and right/left directions.

When the result of the correlation detector 29 shows strong correlation in the right/left direction, as shown in (1) in FIG. 6, interpolation of R pixels is calculated from the six R pixels in the horizontal direction above and below the G pixel at the position to be interpolated, and interpolation of B pixels is carried out by using two B pixels on the right and left sides of the G pixel at the position to be interpolated. The above interpolation is carried out in a pixel interpolator 30 shown in FIG. 5.

When the result of the correlation detector 29 shows strong correlation in the vertical direction, a similar process will be carried out. That is, as shown in (2) in FIG. 6, interpolation of B pixels is calculated from the six vertically disposed B pixels on the right and left sides of the G pixel at the position to be interpolated, and interpolation of R pixels is carried out by using two R pixels above and below the G pixel at the position to be interpolated. The above interpolation is carried out in the pixel interpolator 30 shown in FIG. 5.

Figure 7:
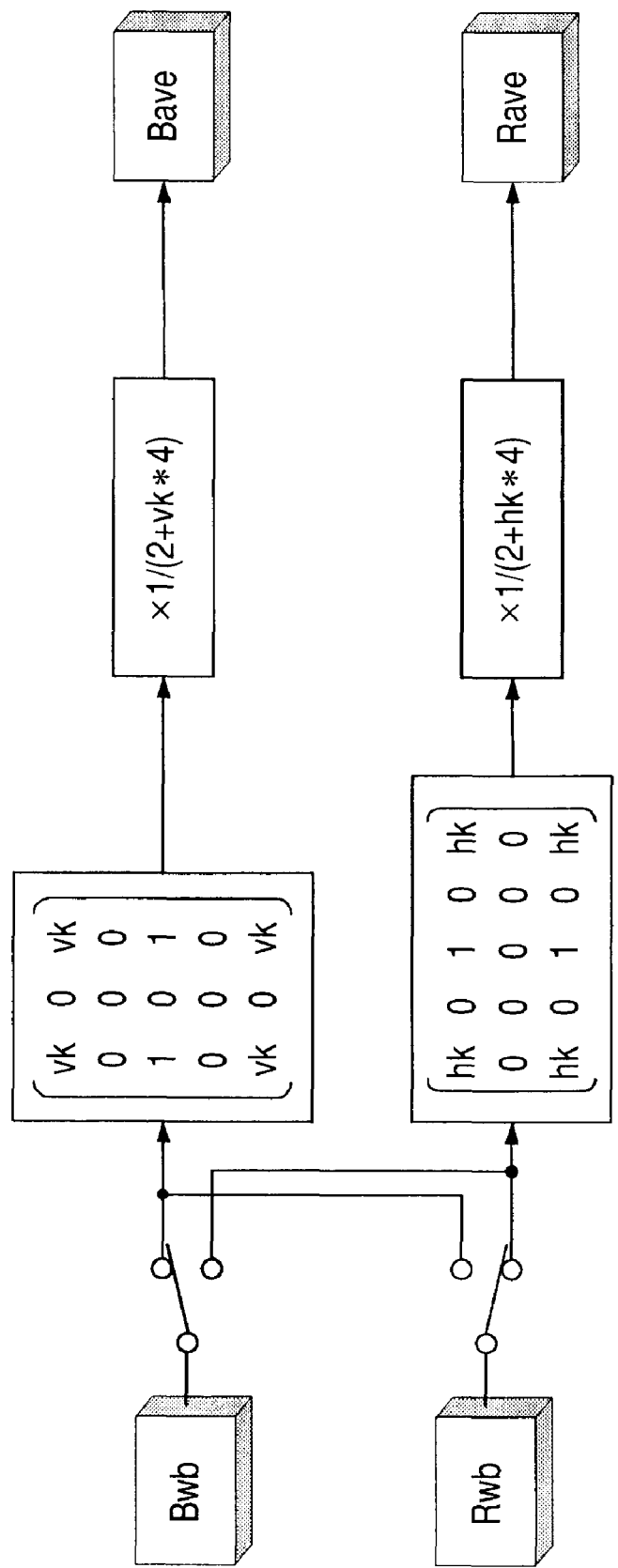
FIG. 7 shows an algorithm illustrating an example of interpolation B.

The actual process shown in FIG. 5 is carried out by computation using filters shown in FIG. 7. The correlation result is used to set coefficients vk and hk to one or zero, and then the above process is performed.

The processes described above allow precise interpolation of pixels having the same color.

An example of correlation detection will now be described with reference to FIGS. 10 to 17.

Figure 10:
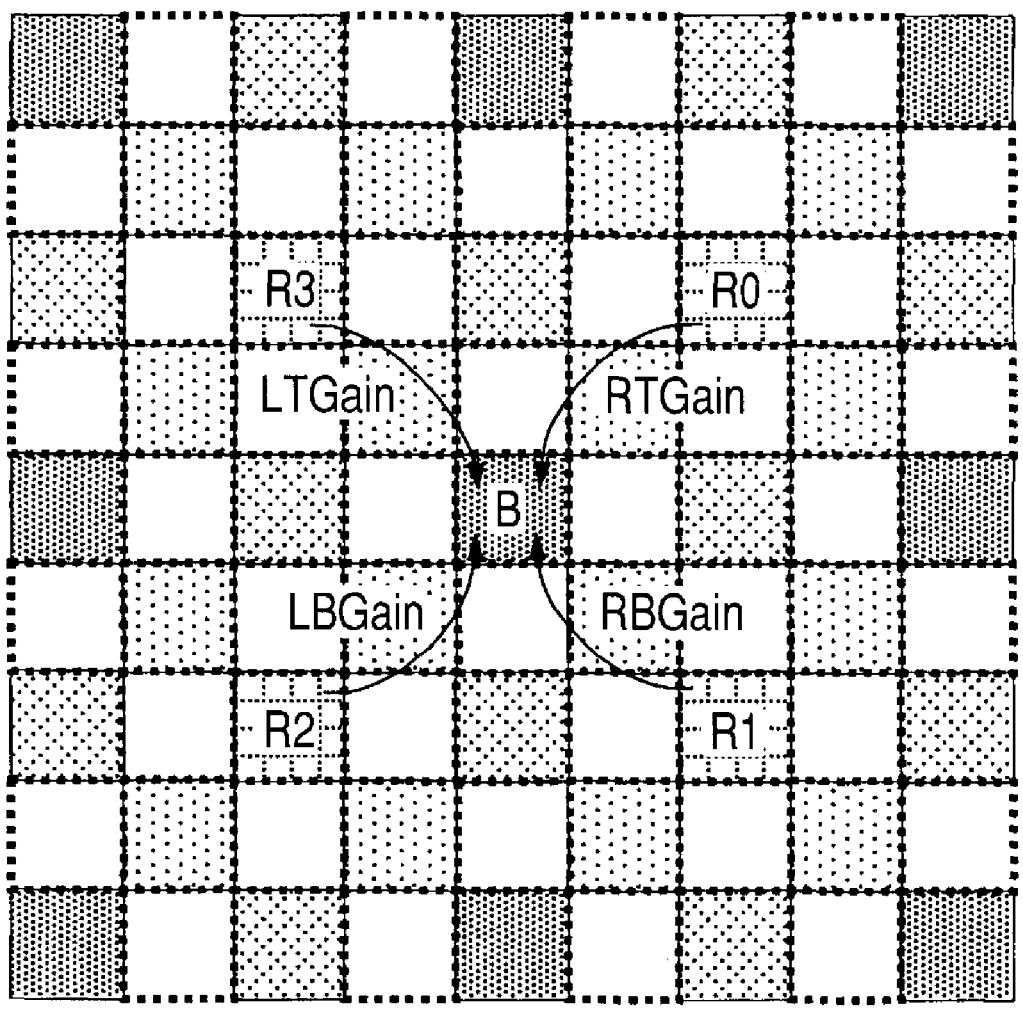
FIG. 10 is a layout diagram showing exemplary correlation coefficients between the B pixel at the position to be interpolated and an array of R pixels.
Figure 13:
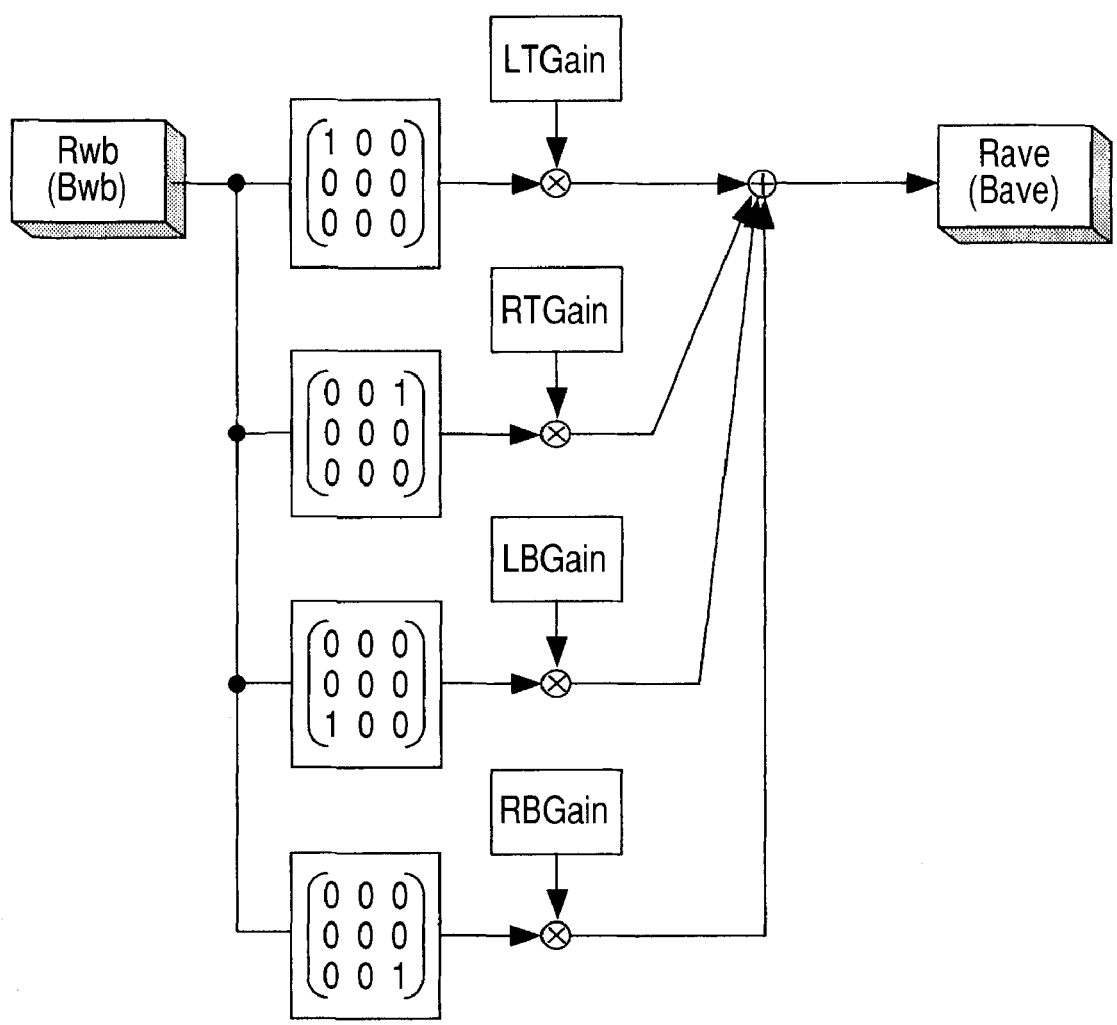
FIG. 13 shows an algorithm illustrating an example of pixel interpolation.

FIG. 10 illustrates correlation coefficients between the B pixel at the position to be interpolated and an array of R pixels. FIG. 11 illustrates a correlation detection algorithm.

As shown in FIG. 10, four R pixels are disposed in 45° diagonal directions with respect to the B pixel. Let R0 be the upper right R pixel and let R1 to R3 be the other pixels clockwise for convenience. Let RTGain, RBGain, LBGain and LTGain be correlation gains, which correspond to R0 to R3, respectively.

As shown in FIG. 11, in this example, low-pass filters (LPFs) are applied in diagonal directions with respect to the center B pixel at the position to be interpolated. In this case, the low-pass filters (LPFs) are applied to W pixels (Wwb). High-pass filters (HPFs) are then applied to the result W pixels so as to calculate difference values RT, LB, LT and RB. The stronger the correlation, the smaller the difference value.

FIG. 12 shows correlation coefficient calculation equations. The above difference values RT, LB, LT and RB are substituted into the correlation coefficient calculation equations to determine the correlation coefficients. These calculation equations are used to set the mixing ratios in the four directions to one and adjust the coefficient in the direction showing strong correlation into a large value.

Figure 14:
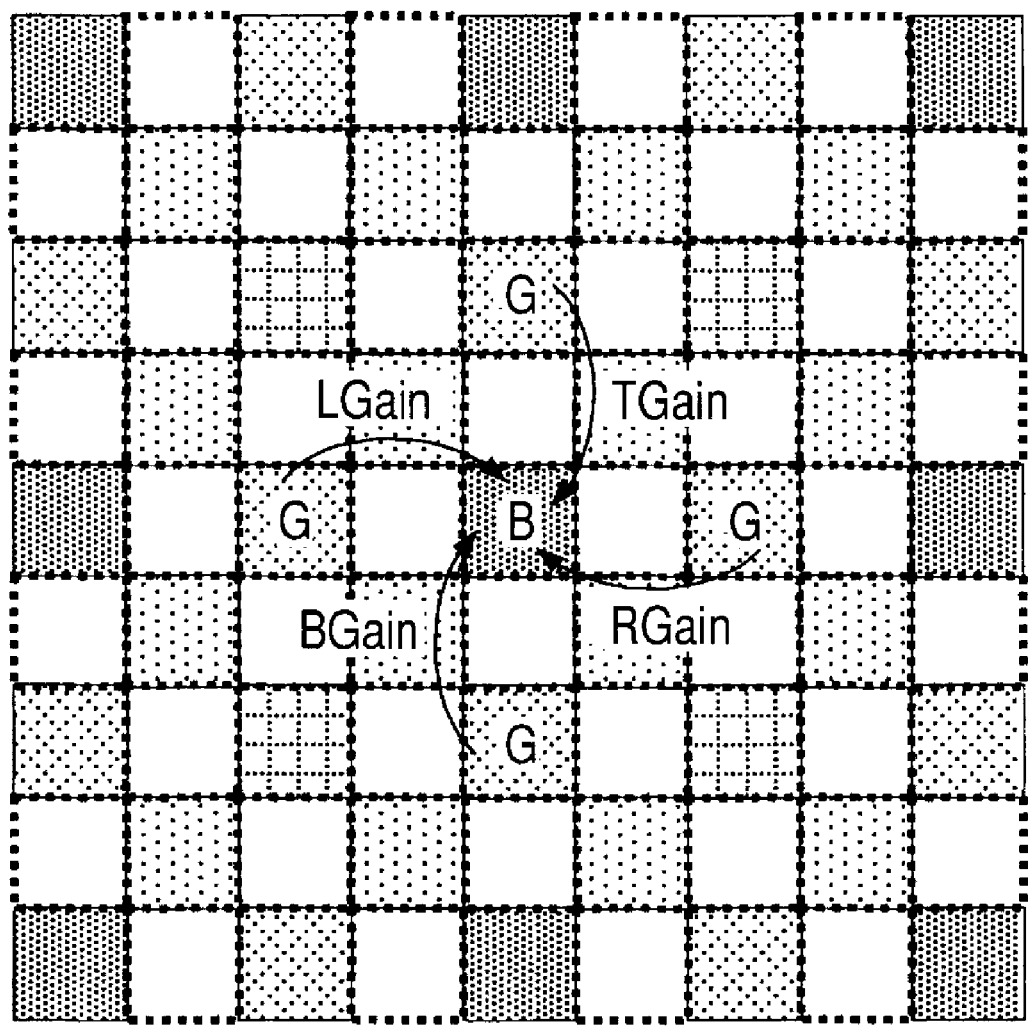
FIG. 14 is a layout diagram showing correlation coefficients between the B pixel at the position to be interpolated and an array of G pixels.
Figure 17:
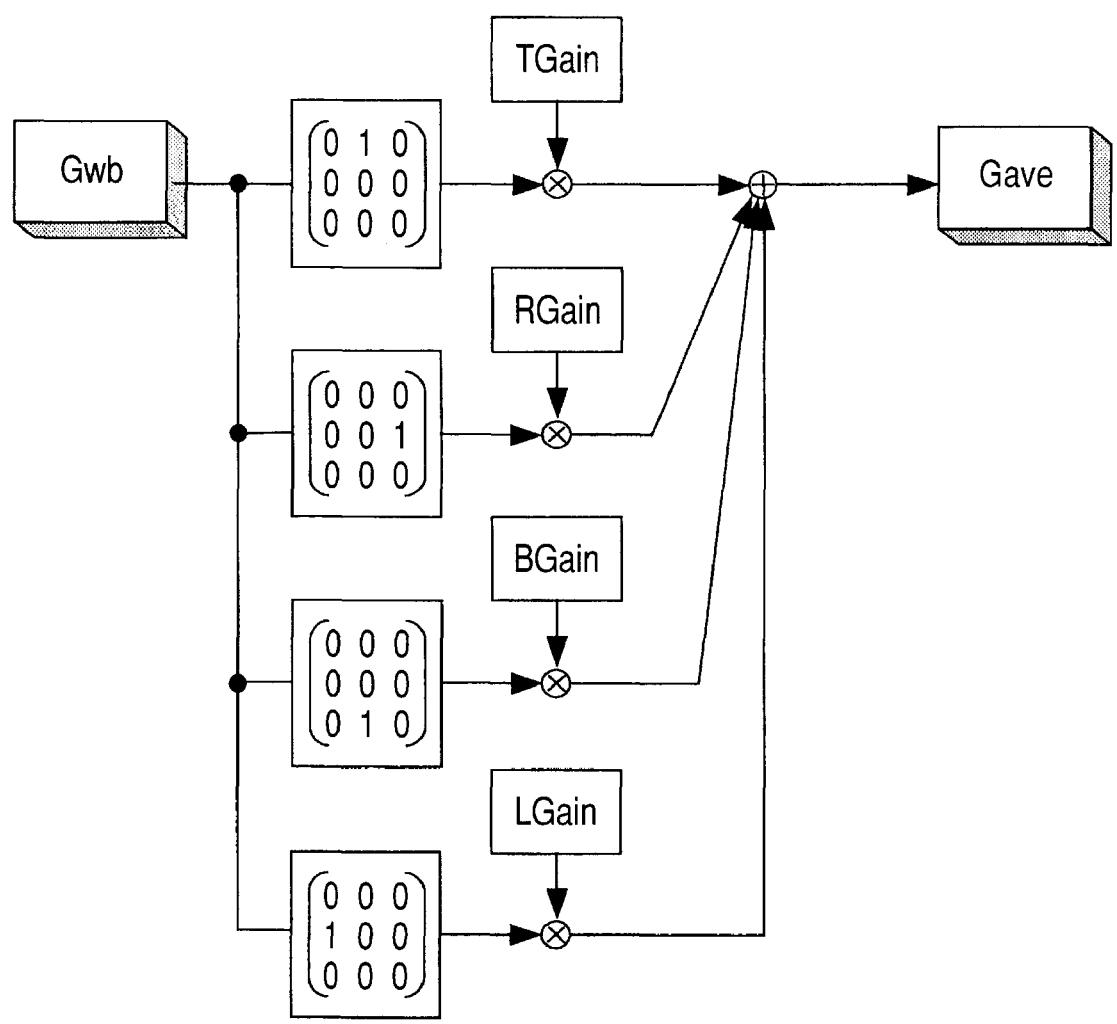
FIG. 17 shows an algorithm illustrating an example of pixel interpolation.

Pixel interpolation is finally carried out. The pixel interpolation is carried out according to the algorithm shown in FIG. 13. In the example shown in FIG. 10, the algorithm is defined as follows:

R pixels used for interpolation on the position of B pixel =R0*RTGain+R1*RBGain+R2*LBGain+R3*LTGain Next, FIG. 14 illustrates correlation coefficients between the B pixel at the position to be interpolated and an array of G pixels.

As shown in FIG. 14, the G pixels are situated in the up/down and right/left directions with respect to the B pixel. Correlation detection of the G pixels is carried out in a circuit implementing the correlation detection algorithm shown in FIG. 15.

To determine correlation of the G pixels, W pixels adjacent to the B pixel are also used to increase the detection accuracy because the G pixel appears every four periods. The same method described above is applied, that is, low-pass filters (LPFs) are applied, followed by high-pass filters (HPFs), to determine difference values. In addition to the above, the calculation result for the W pixels and the calculation result for the G pixels are used in a weighting process in order to suppress the effect of colors of the subject. The resultant difference values SR, SL, ST and SB are substituted into the correlation coefficient calculation equations shown in FIG. 16 to determine the correlation coefficients.

Pixel interpolation is finally carried out. The pixel interpolation is carried out, for example, according to the algorithm shown in FIG. 17 so as to determine G pixels used for interpolation on the position of the B pixel.

The imaging device according to another embodiment (second example) of the invention will be described with reference to FIGS. 18 to 26. Firstly, the level balance block 14 in the detailed view of the signal processor described with reference to FIG. 1 is used to generate a (high-frequency) luminance signal in which the level of the W signal is the same as that of the Y signal. FIG. 18 shows a signal layout after the level balance process.

In FIG. 18, W denotes a W pixel (pixel indicated by a plain rectangle), and Y denotes luminance calculated from the amount of signals of the R/G/B pixels determined by interpolation (pixel indicated by a hatched rectangle). The broken line indicates a phase where no pixel is present. Information of this phase will be complemented by a process described later.

Since the levels of the raw W and Y signals are different from each other, low-pass filters (LPFs), shown in FIG. 19 by way of example, are applied. Then, Y is multiplied by the ratio Wave/Yave, where Wave is the average of Ws and Yave is the average of Ys, so as to normalize Y with respect to the level of W, as indicated by the equations expressed in the forms of luminance and chrominance shown in FIG. 20. Since this process changes the luminance, R/G/B are similarly normalized so as to match chrominance levels with respect to each other. That is, R is multiplied by the ratio Wave/Rave, where Wave is the average of Ws and Rave is the average of Rs, so as to normalize R with respect to the level of W. G and B are normalized in a similar manner except that R is replaced with G and B, respectively.

Figures 20, 21:
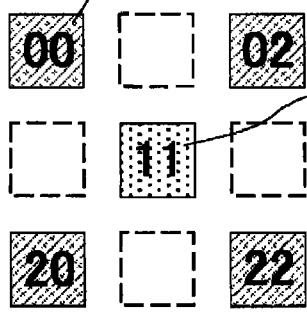
FIG. 20 shows equations expressed in the forms of luminance and chrominance.
FIG. 21 is a layout diagram showing an example of interpolation of R/G/B pixels on the position where a W pixel is present, and also shows an interpolation equation.

Then, interpolation of R/G/B pixels is carried out on the position where a W pixel is present. As shown in FIG. 21, since W pixels are present at all phases where pixels are present, the W pixels are used to interpolate R/G/B pixels. FIG. 21 shows the interpolation equation for an R pixel. Calculation for B and G pixels can be carried out by computation similar to that for R pixels.

Figure 22:
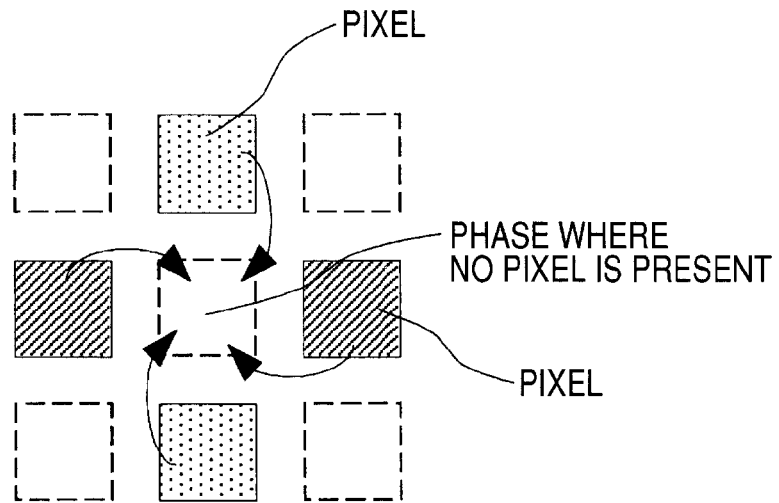
FIG. 22 is a layout diagram showing an example of complementation using W pixels as correlation detection signals.

Pixel complementation is finally carried out on the phase where no pixel is present. This complementation process is dynamically carried out using W pixels as correlation detection signals according to correlation intensities of four pixels above and below as well as on the right and left, as shown in FIG. 22.

In the process described above, the luminance signal and the chrominance signal are generated.

Figure 23:
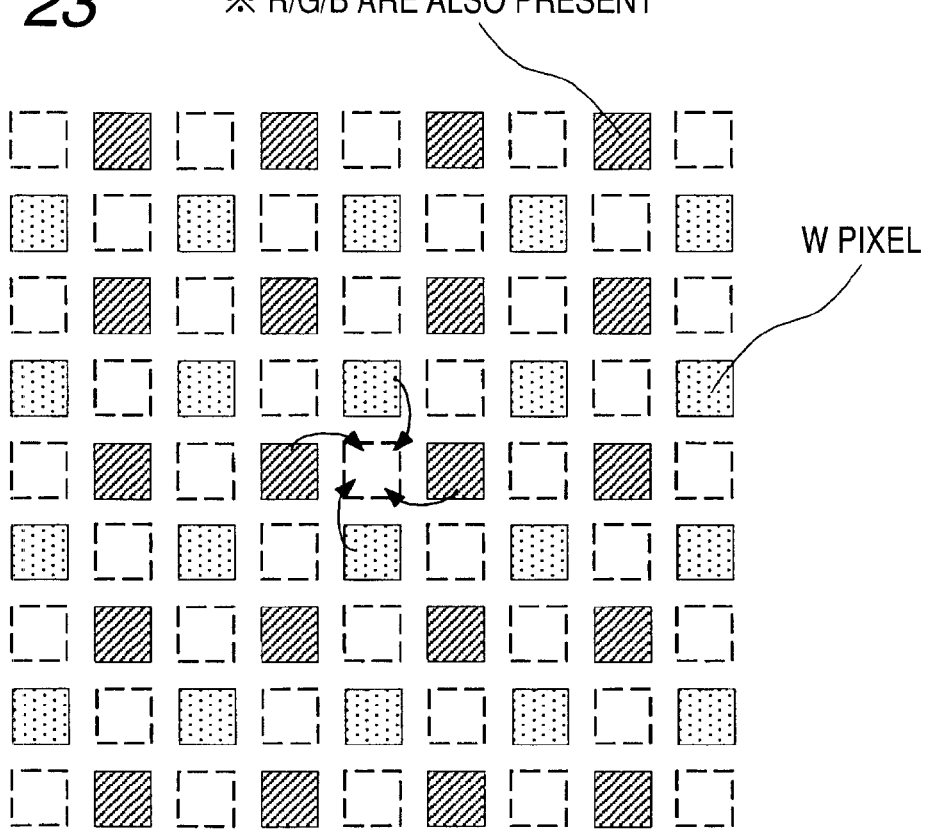
FIG. 23 is a layout diagram showing an example of pixel complementation on the phase where no pixel is present.

Next, an example of the correlation detection will be described with reference to FIGS. 23 to 26. FIG. 23 shows pixel complementation on the phase where no pixel is present.

As shown in FIG. 23, the hatched pixels are those obtained by generating Y from R/G/B pixels determined by interpolation and further normalizing Y into W pixels, and the pixels indicated by plain rectangles indicate W pixels themselves. In this illustrated state, in order to carry out pixel complementation on the phase situated at the center of the figure where no pixel is present, the following process will be carried out.

Figure 24:
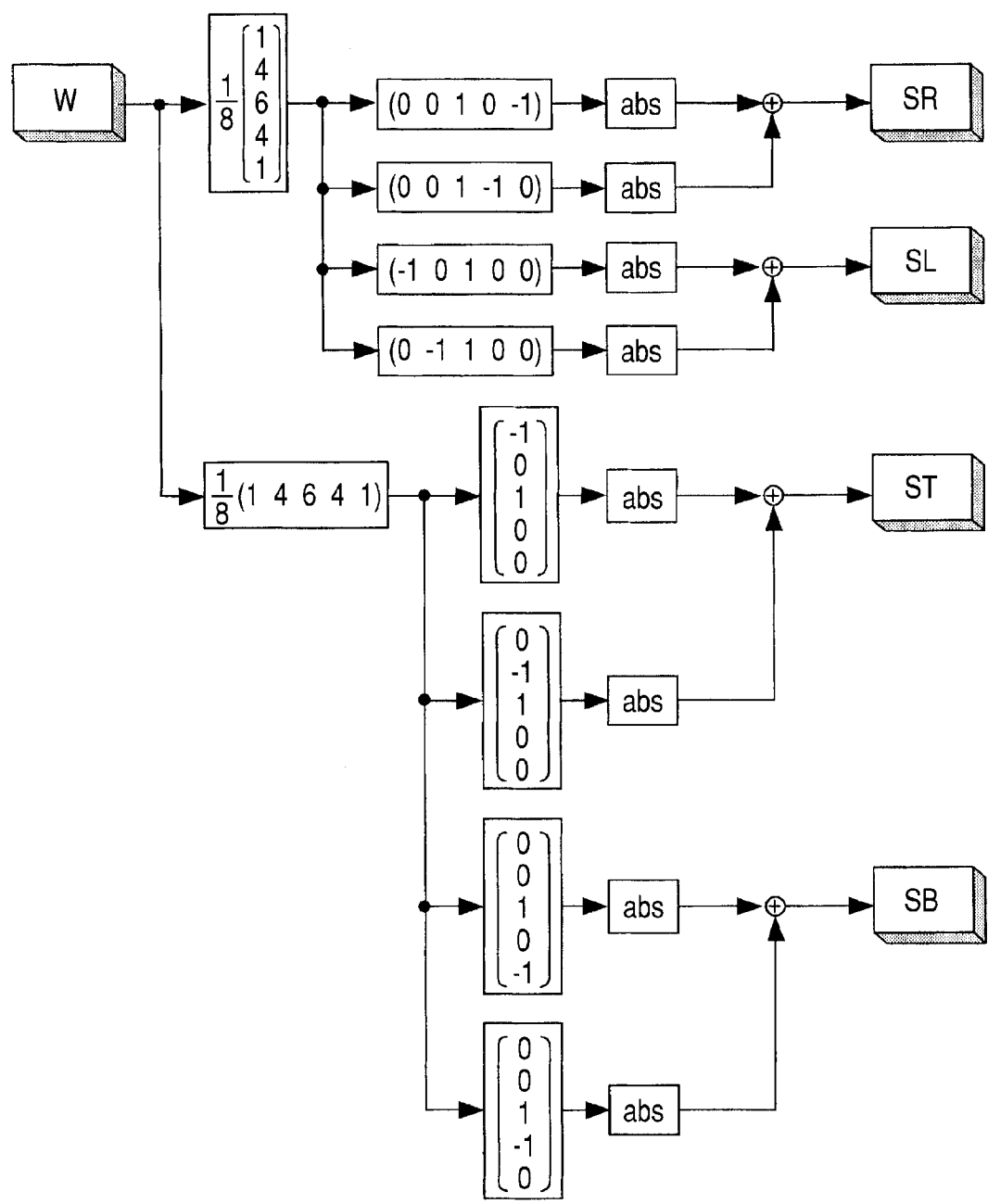
FIG. 24 shows an algorithm illustrating an example where low-pass filters are applied to W pixels in the horizontal/vertical directions.

As shown in FIG. 24, in this example, low-pass filters (LPFs) are applied to the W pixels in the horizontal/vertical directions. Then, high-pass filters (HPFs) are applied so as to calculate difference values SR, SL, ST and SB.

Figures 25, 26:
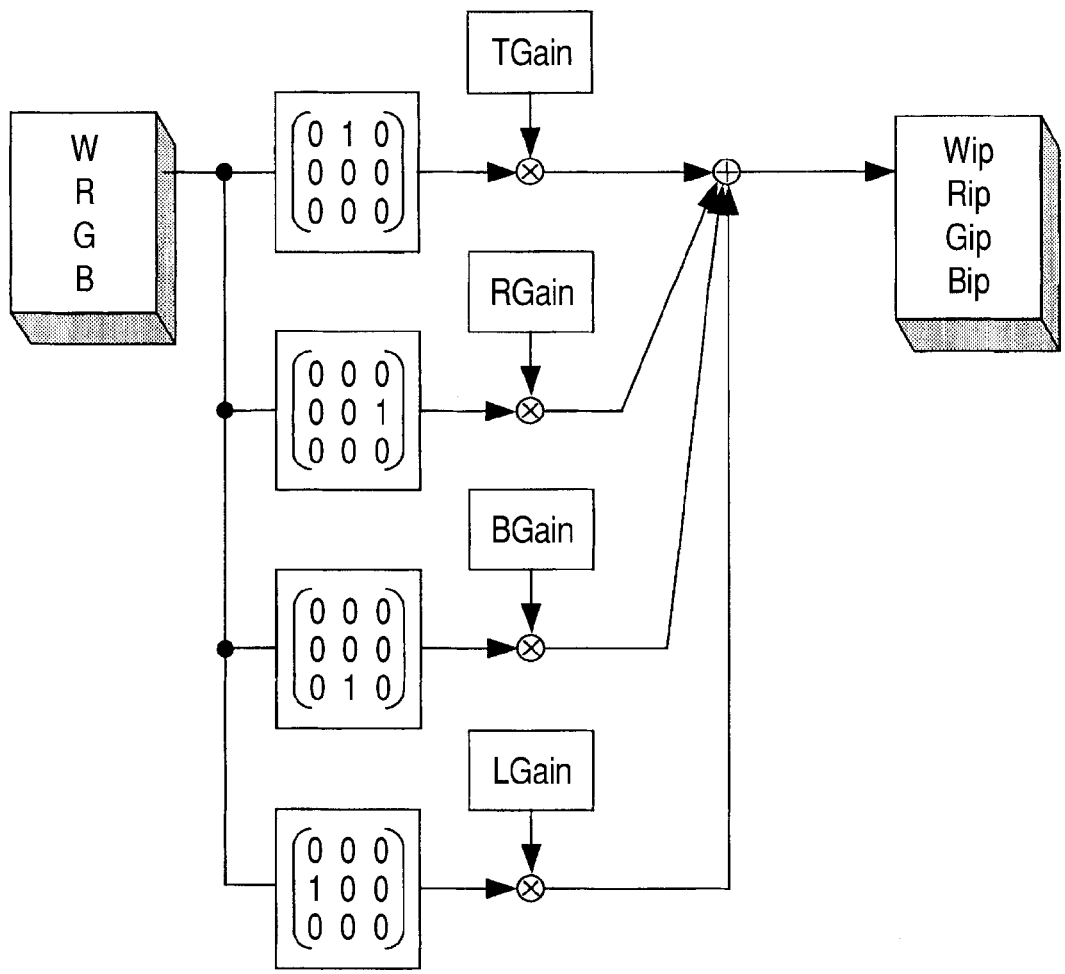
FIG. 25 shows correlation coefficient calculation equations.
FIG. 26 shows an algorithm illustrating an example of pixel interpolation.

FIG. 25 shows correlation coefficient calculation equations. The above difference values SR, SL, ST and SB are substituted into the correlation coefficient calculation equations to determine correlation coefficients RGain, LGain, TGain and BGain, respectively.

Pixel interpolation is finally carried out. In this pixel interpolation, pixel complementation is carried out on the phase where no pixel is present according to the algorithm shown in FIG. 26. This complementation is applied not only to W pixels but also to R, G and B pixels.

As described above, according to an embodiment of the invention, there are provided the color judgment block 12 that judges whether or not an imaged subject is of chromatic color and the pixel interpolators 26, 28, 30 and the like that switch between the pixel interpolation methods according to the signal judged in the color judgment block 12 that judges whether or not the subject is of chromatic color, the pixel interpolators 26, 28, 30 and the like giving high priority to interpolation using pixels showing strong correlation based on the information from the correlation detectors 25, 27, 29 and the like when the color judgment block 12 judges that the subject is of chromatic color. The provision of the color judgment block and the pixel interpolators allows interpolation of the chromatic color pixels and hence an extended frequency band compared to simple average pixel interpolation. Furthermore, false colors in a chromatic color subject are suppressed compared to simple average pixel interpolation.

Although the above description has been made of the case where "white pixels" are used as an example of the high-sensitivity pixels, the high-sensitivity pixel is not limited to a (ideal) white or transparent pixel in the strict sense, but may be other pixels as far as their sensitivity is higher than that of conventional primary color pixels or complementary color pixels used to obtain color components for color reproduction. For example, the high-sensitivity pixel may be a pixel provided with a gray filter obtained by mixing a slight amount of component that blocks light with an ideal white or transparent state or a pixel provided with a filter obtained by mixing a slight amount of dye component with an ideal white or transparent state. However, from the viewpoint of carrying out signal processing, a filter in which color components of transmitted light are well balanced, such as a gray filter, is preferable compared to a filter in which a specific dye component is mixed in an unbalanced manner.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   an image sensor having a plurality of chromatic color pixels and high-sensitivity pixels having higher sensitivity to incident light than the chromatic color pixels arranged in a checkerboard pattern;
   a correlation detector that detects correlation of an imaged subject from a signal component of the high-sensitivity pixels and a signal component of the chromatic color pixels;
   a color judgment block that judges whether or not the imaged subject is of chromatic color from the signal component of the chromatic color pixels; and
   a pixel interpolator that switches between pixel interpolation methods according to the signal judged in the color judgment block that judges whether or not the subject is of chromatic color, the pixel interpolator giving high priority to interpolation using pixels showing strong correlation based on the information from the correlation detector when the color judgment block judges that the subject is of chromatic color.

2. The imaging device according to claim 1, wherein the high-sensitivity pixels are white pixels or gray pixels.

3. The imaging device according to claim 1, further comprising a chrominance interpolation block that applies the correlation result detected from the high-sensitivity pixels and outputted from the correlation detection block that uses a luminance signal as a detection signal to judge the pixel interpolation so as to generate a chrominance signal.

\* \* \* \* \*